(12) United States Patent
Lau et al.

(10) Patent No.: US 7,015,429 B2
(45) Date of Patent: Mar. 21, 2006

(54) DEEP FRYER

(75) Inventors: Joseph Wing Chung Lau, Pokfulam (HK); Wallace Lai, Kowloon (HK)

(73) Assignee: Eastern Sources Housewares (Hong Kong) Limited, Hong Kong (HK)

( * ) Notice: Subject to any disclaimer, the term of this patent is extended or adjusted under 35 U.S.C. 154(b) by 0 days.

(21) Appl. No.: 10/794,814

(22) Filed: Mar. 8, 2004

(65) Prior Publication Data

US 2005/0194372 A1    Sep. 8, 2005

(51) Int. Cl.
*A47J 37/12*    (2006.01)
(52) U.S. Cl. .................. 219/441; 219/430; 99/403; 99/444
(58) Field of Classification Search ............... 219/429, 219/430, 432, 433; 99/403, 444, 446
See application file for complete search history.

(56) References Cited

U.S. PATENT DOCUMENTS

| | | | | |
|---|---|---|---|---|
| 2,010,664 A | * | 8/1935 | Hanks | 219/441 |
| 3,463,077 A | * | 8/1969 | Lescure | 99/403 |
| 4,485,801 A | * | 12/1984 | Hodges et al. | 99/446 |
| 5,415,082 A | * | 5/1995 | Nagao | 99/403 |
| 5,481,967 A | * | 1/1996 | Chen | 99/446 |
| 5,511,466 A | * | 4/1996 | Dzibinski | 99/446 |
| 5,595,108 A | * | 1/1997 | Sheu | 99/446 |
| 6,546,848 B1 | * | 4/2003 | Ehlhardt et al. | 99/403 |

FOREIGN PATENT DOCUMENTS

| | | |
|---|---|---|
| WO | WO 03/030698 | 2/2003 |
| WO | WO 03/030697 | 4/2003 |

* cited by examiner

*Primary Examiner*—Joseph Pelham
(74) *Attorney, Agent, or Firm*—Renner, Kenner, Greive, Bobak, Taylor & Weber

(57) ABSTRACT

A deep fryer has an outer housing (4) closed by a lid (14) and an immersed type heating element (28) extending into an oil containing receptacle (22), the housing having an upper rim at which the lid (14) is supported, with the underside of the lid (14) having an upwardly domed shape and the rim formed with a channel (44) arranged beneath the periphery of the underside of lid (14) to receive droplets of moisture condensing on the underside of the lid during use, a sensor (31) being provided which includes a thermal use and temperature sensing element (56) disposed in a single tubular housing.

8 Claims, 10 Drawing Sheets

Fig. 3  Section A-A

DEEP FRYER

BACKGROUND OF THE INVENTION

The present invention relates to a fryer for culinary use of the type having a deep receptacle for containing a cooking medium such as oil into which the food is immersed, such fryers being commonly referred to as "deep fryers" or "deep fat fryers".

Deep fryers have been used for frying of food in commercial establishments for very many years. It is only more recently that deep fryers of a smaller dimension have become popular for use in the home. Such deep fryers generally have an outer housing which may be plastic or metal which supports an inner oil containing receptacle formed of metal or other heat resilient material such as ceramic or tempered glass. A heating element is arranged either immediately below the receptacle in a so-called "non-immersion" type, or extends into the receptacle either through an opening in the receptacle wall or is shaped to extend over the top of the wall down towards the bottom of the receptacle in an "immersion" type. In the latter type the oil is heated directly, which has the advantages that the thermal performance is generally better than the non-immersion type with pre-heat time is reduced, response time to regain proper cooking temperature on immersion of food reduced, and the power rating can generally be smaller for equal cooking effect.

For fryers to be used in the home, it is highly desirable to provide the fryer with a lid, both for safety reasons preventing accidental access to or the spitting out of hot oil, and to contain or at least partly contain the vapours produced during cooking to limit their spread through the home. A problem however with providing a lid is that this traps moisture which has been released from the food being cooked, the moisture tending to condense on the lid and dripping back into the receptacle of hot oil where it adversely affects the cooking process. The present invention seeks to overcome this problem.

SUMMARY OF THE INVENTION

In a first aspect the invention provides a deep fryer comprising an outer housing closed by a lid, the housing having an upper rim at which the lid is supported, wherein the underside of the lid has an upwardly domed shape and the rim is formed with a channel arranged beneath the periphery of the underside of lid to receive droplets of moisture condensing on the underside of the lid during use.

This arrangement ensures that the condensing moisture is largely prevented from dripping into the hot oil, thereby greatly reducing undesirable and potentially hazardous spitting of oil, and reducing the deleterious effect on quality of cooking.

A wide variety of domed shapes can be used for the underside of the lid from a relatively shallow dome to a steeper dome. Preferably, the shape is smoothly curving, being free of any discontinuities in shape which might encourage the collection of droplets of moisture.

In the preferred embodiment the upper rim of the housing is formed with a lip disposed inwardly of said channel on which, in use, a receptacle for a cooking medium is seated. The rim is formed at its uppermost and outermost region with a ledge on which the lid sits. The channel may extend around substantially the entire upper rim, and gently slopes around the rim, with one or more drainage openings formed in the rim, and the rim sloping towards the or each drainage opening. A moisture containing receptacle is arranged on the housing beneath the or each drainage opening.

Such deep fryers are also generally provided with some means of monitoring the oil temperature, either simply to give an indication of temperature to the user, or being connected to a control unit which controls the heating by the heating element. Conventionally, such fryers use a temperature sensor and safety limitor which consists of an oil filled sensor bulb located adjacent the heating element connected to a detection circuit in the control unit by means of a fine capillary tube. The expansion or contraction of oil in the sensor bulb and capillary is detected in the electronic circuit in the control unit, serving to cut the electrical supply to the heating element in an overheat condition, and otherwise providing a temperature indication. Such capillary type sensors have several drawbacks. The fine capillary tube is fragile, and it can be difficult to see if it becomes broken. In the event that it does break, this causes a complete failure of the control. The mineral oil used in the sensor is also not safe for human consumption.

In a further aspect the present invention is directed to providing an improved type of sensor.

According to a further aspect the invention provides a sensor for use in an electrical cooking appliance of the type having an immersed heating element, comprising a temperature sensing element and a thermal fuse disposed within a single outer heat conductive tubular housing.

Such a structure is significantly more robust than the conventional capillary-type arrangement, is far easier to install and is easier for the user to clean.

The tubular housing is preferably closed at its end by a plug of thermally conductive material, with the temperature sensing element is disposed within or adjacent said plug. The plug is formed with an internal cavity with the sensing element located therein.

Preferably, the temperature sensing element is a thermistor. Use of such an element within the described sensor structure is able to produce a sensor of considerably more accurate nature than the conventional capillary arrangement, and which has a greater sensitivity to temperature variations.

The invention also resides in a deep fryer having an immersion type heating element for immersion into a receptacle for containing a cooking medium, wherein a sensor as defined above is supported adjacent the heating element. The deep fryer may also have a control unit to which the sensor and heating element are connected and including a solenoid-activated relay switch connected to the heating element, the thermal fuse being connected to the solenoid side of said relay switch. It may also be arranged that the control unit has a pair of relay switches, the thermal fuse being connected to the solenoid side of both relay switches, this arrangement providing a degree of redundancy in case of failure of either relay switch.

In a still further aspect the invention resides in a deep fryer having an inner cooking receptacle which sits within an outer housing, and a heating unit comprising a heating element and a control unit, the heating unit being supported on the housing, a portion of the heating unit resting on an upper peripheral rim of the receptacle, and whereby the heating unit is supported in a lower position in the absence of the receptacle, the control unit including cut-out switch means arranged to disable the control unit in the lower position.

The housing may be provided with a support for the heating unit which support has an opening which is aligned with an actuating portion of the cut-out switch in the lower position.

BRIEF DESCRIPTION OF THE DRAWINGS

An embodiment of the present invention is now described, by way of example only, with reference to the following drawings in which.

DESCRIPTION OF THE PREFERRED EMBODIMENT

Figure 1:
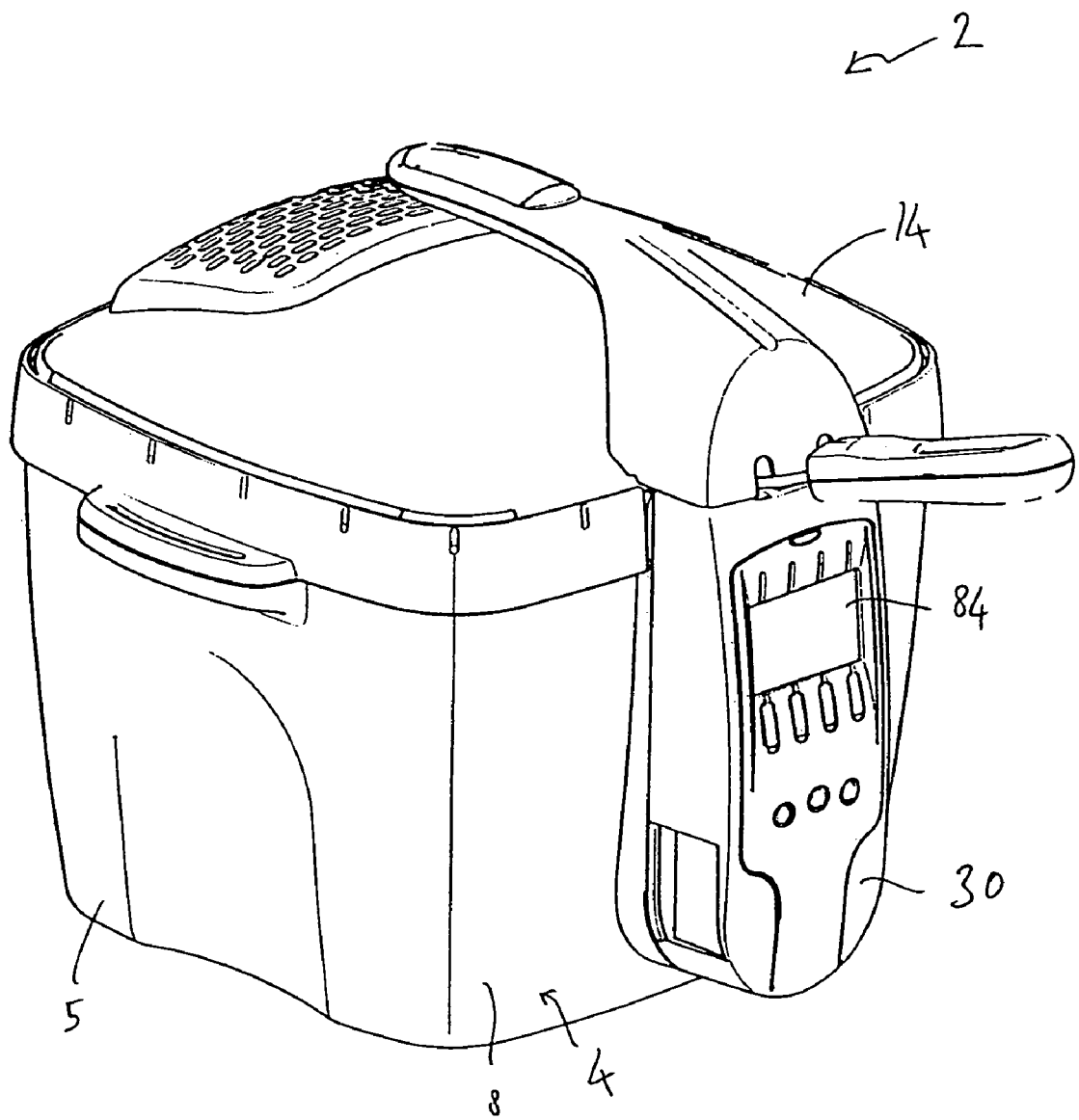
FIG. 1 is an external view of a deep fryer in accordance with a first aspect of the invention.
Figure 2:
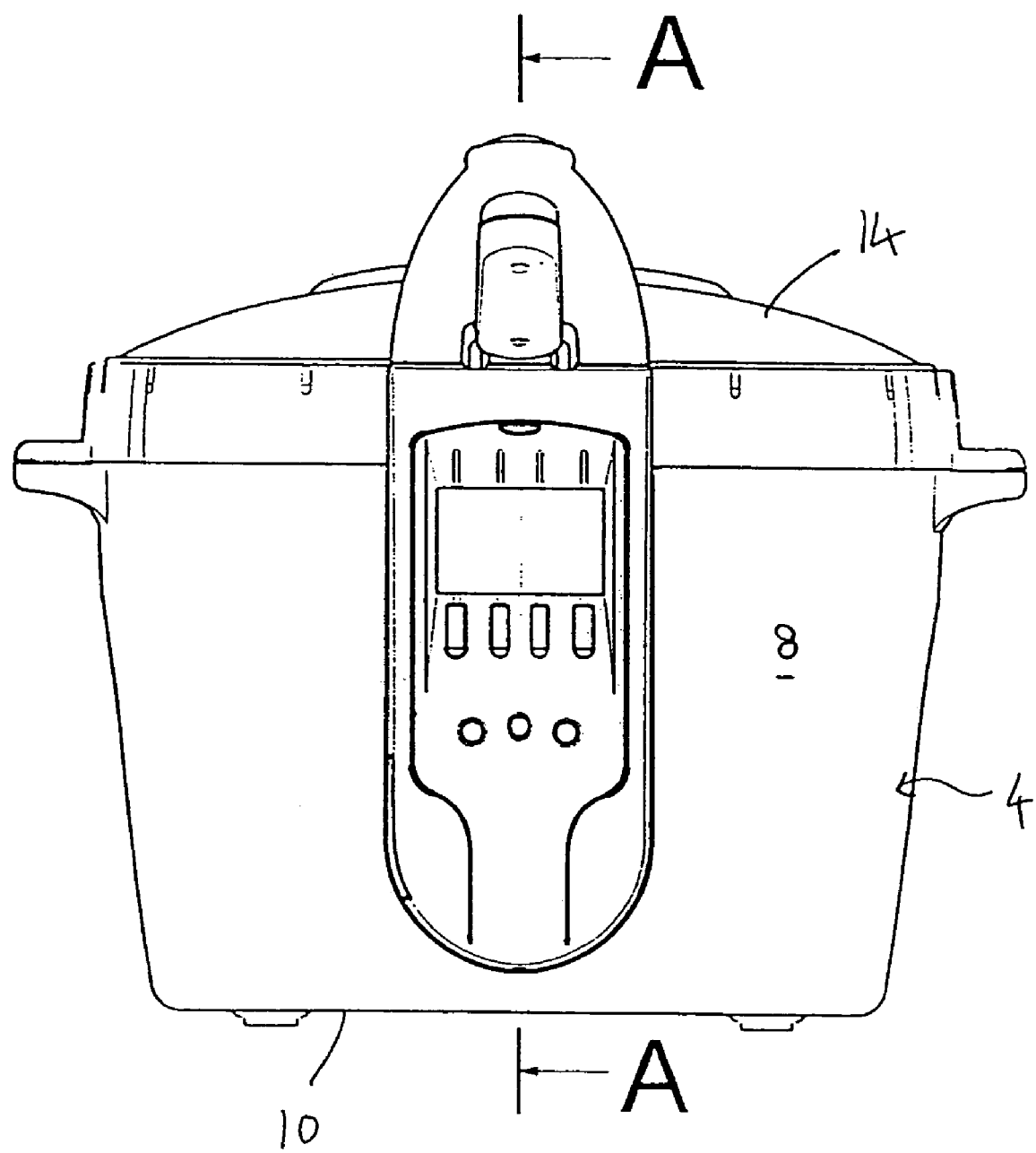
FIG. 2 shows the front of the deep fryer of FIG. 1.
Figure 4:
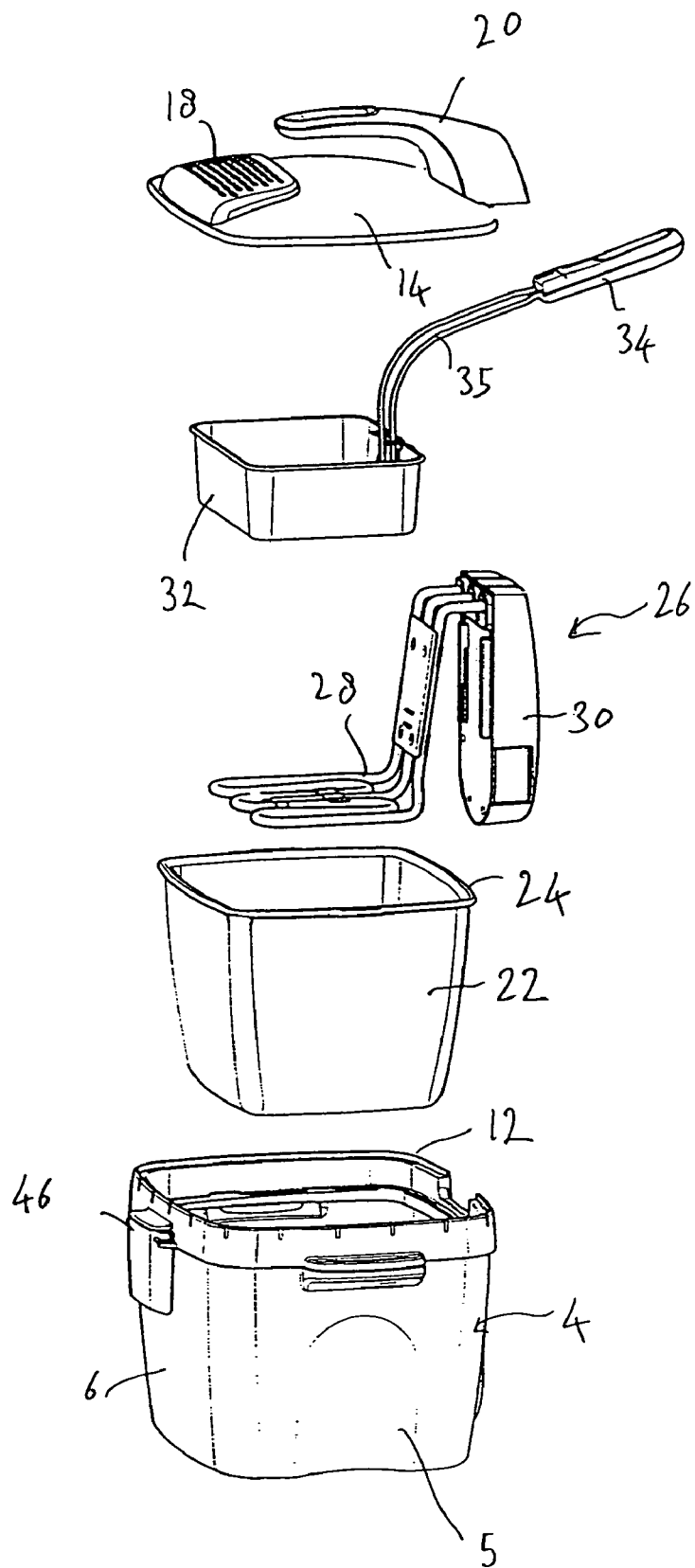
FIG. 4 is a disassembled view of the deep fryer.

Turning to the drawings, a deep fryer according to an embodiment of the invention is illustrated in FIG. 1 being generally indicated by numeral 2. As best seen in FIGS. 1 and 4 the deep fryer 2 comprises an outer housing 4 having four sidewalls 5, 6, 7, 8 respectively and a base 10. The housing may be formed of a variety of different materials most preferably of a plastics material or metal for ease of construction. The housing has an upper rim 12. A lid 14 closes the housing, sitting on the rim 12. The lid 14 is formed with a vent region 18 to allow the limited egress of steam and other cooking vapours. A handle 20 is provided to facilitate opening and closing of the lid. Further constructional details of the lid will be described below.

A receptacle 22 is provided which in use receives the cooking oil, this being in the form of a simple bowl of similar shape to the housing 4. An upper outwardly turned rim 24 simply rests on a portion of the upper housing rim 12 and can be lifted off and removed for cleaning purposes. The receptacle 22 may be formed of a metal such as stainless steel, or other heat resistant materials such as a ceramic material or a tempered glass, as is well-known in the art. If tempered glass is used the housing 4 may also be formed of a translucent or transparent plastics so that it is then possible to observe the cooking of the food. In this case it is also desirable from a safety point of view if the receptacle 22 includes a visual indication to the user that the receptacle should not be placed directly on gas flame or electric element of a stove top, by way of a prominent warning notice. Although the tempered glass can be highly heat resistant, depending on the exact specifications such a glass receptacle may not be suited to use on a stove top.

A heating unit 26 is provided comprising a conventional resistance type heating element 28 connected to a control unit 30, shaped so that the control unit 30 is in use installed on the exterior of the housing 4 with the heating element 28 extending over the rim 24 of the receptacle 22 down into and along the bottom of the receptacle 22. As is conventional, the heating element 28 may have a serpentine-like portion at the lower region to maximise the area providing the heating effect at the bottom of the receptacle 22. Also disposed on the heating element 28 is a sensor element 31, further details of which are discussed below. The control unit 30 with heating element 28 and sensor 31 can be detached from the housing to allow removal of the receptacle for cleaning purposes.

Figure 3:
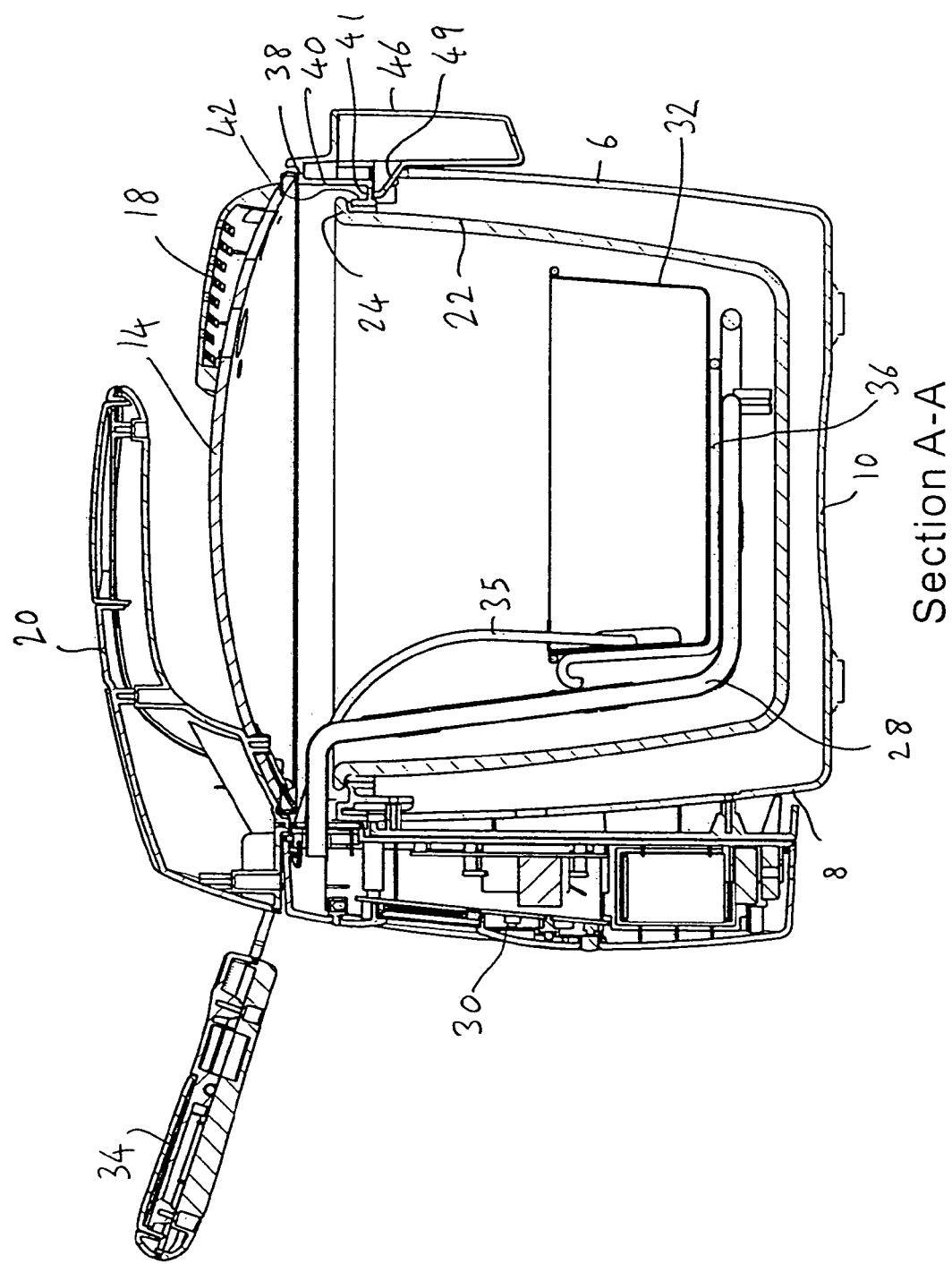
FIG. 3 is a cross-sectional view taken along the line A—A in FIG. 2.

A food-holding basket 32 is provided, which in use sits just over the heating element 28. This is preferably of mesh-like construction. A handle 34 is joined to the basket through long and relatively thin members 35 which serve minimise heat transfer between the oil and the handle 34. As can be seen in FIG. 3, the underside and rear of the basket 32 is formed with a wire member 36 on which the main part of basket 32 rests on the heating element 28, and so that the food remains spaced from the heating element.

Figure 9:
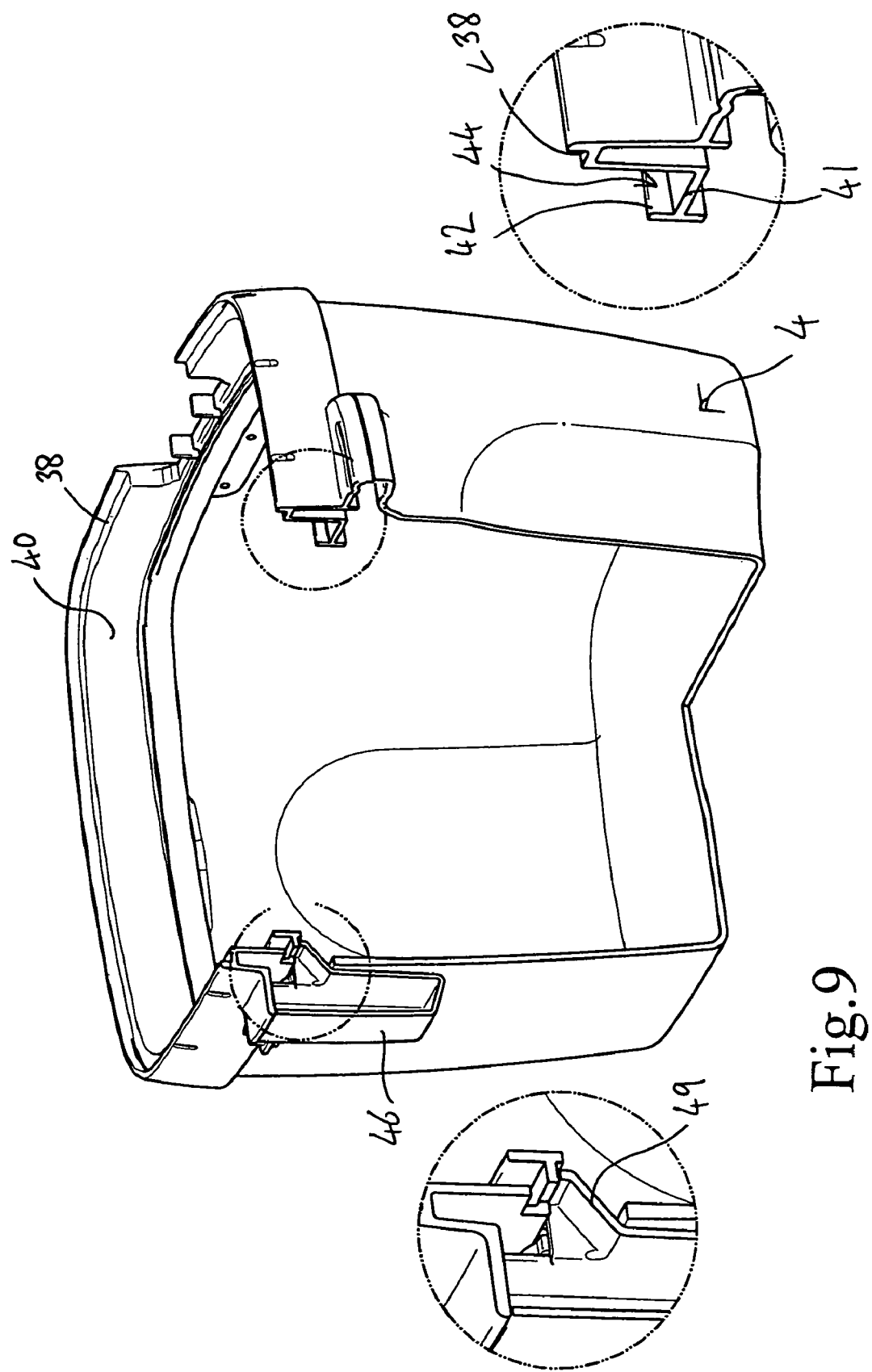
FIG. 9 is a part cut-away view of an outer housing, with enlarged insets showing water-directing channels in section.

Returning to the details of the lid 14, this has at least an underside of a downwardly concave upwardly domed form, ideally having a relatively shallow and smooth profile free of any discontinuities or protuberances. As best seen in FIG. 9 the upper rim 12 of the housing is specifically constructed so as to define an upper ledge 38 which supports the outermost periphery of the lid 14. A vertical wall 40 extends down from this upper ledge to an inwardly directed portion 41 and a short upwardly directed flange 42 defining a channel 44 therebetween. The upper rim 24 of the receptacle 22 rests on the flange 42.

During cooking, moisture in the food turns to steam, some of which escapes through the vent holes 18, a major part of which will inevitably condense as droplets on the underside of the lid. The smoothly domed surface results in controlled run-off of the droplets to the periphery of the lid where the droplets will drip off the lid into the channel 44 or run down the wall 40 into channel 44. It is also arranged that the channel 44 is inclined around the rim 12 to have its lowest point on the rear of the housing, opposite to the control unit 30. The highest point may be adjacent the control unit 30 (ie at the left hand side of FIG. 3 or right-hand side of FIG. 9) in which case two identical ramps are provided around opposite sides of the rim, or might alternatively be immediately adjacent the lowermost part with a step therebetween, so that there is a single path for water flow around the rim. At the lowest point of the channel 44 a drip catcher 46 in the form of a removable enclosure is provided. This has an opening adjacent a ramp portion 49 which fits beneath an opening in the channel 44. This arrangement ensures that a major part of the moisture condensing on the lid is prevented from dripping back into the hot cooking oil, but is instead collected from where it can be disposed of after use of the deep fryer.

Figure 5:
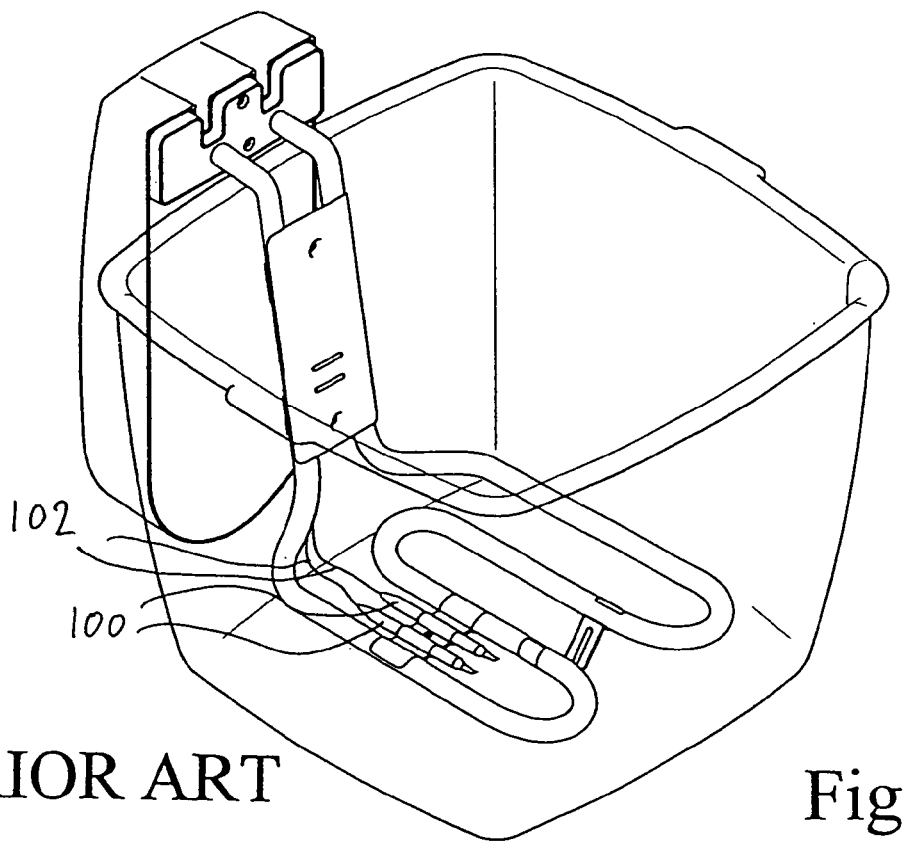
FIG. 5 shows a receptacle with immersed heating element and control sensor according the prior art.
Figure 6:
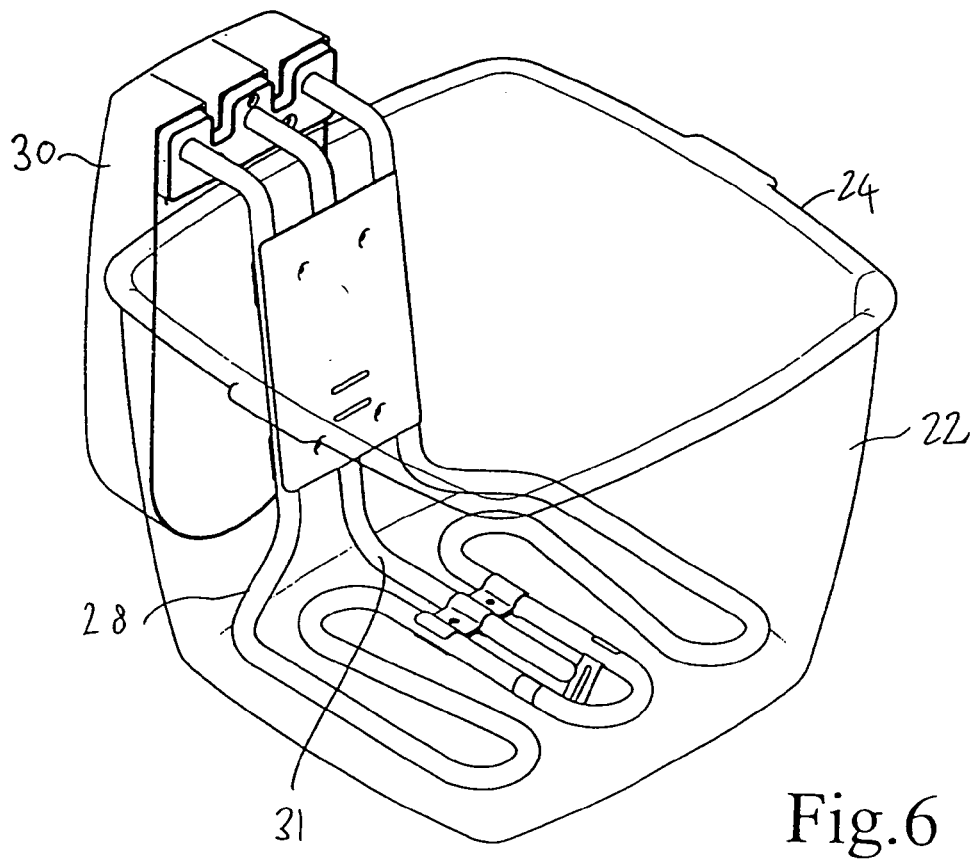
FIG. 6 shows a receptacle with immersed heating element and control sensor according to a further aspect of the invention.

Further details of the sensor and control of the deep fryer are now discussed. A conventional sensor is illustrated in FIG. 5, which as discussed below has one or more oil-filled bulbs 100 one of which constitutes an overheat sensor connected to a control circuit via capillaries 102. The control circuit has components which respond to the oil level within the capillary and output a signal dependent thereon, and hence dependent on temperature.

Figure 8:
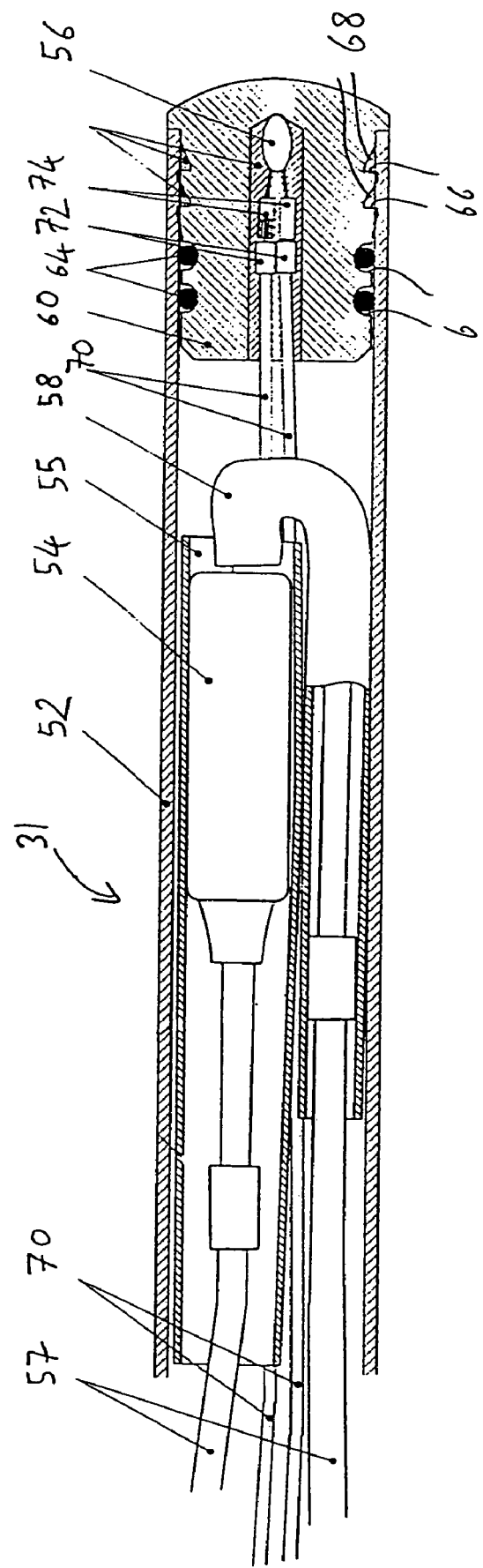
FIG. 8 is a longitudinal part-sectional view through the control sensor.

In contrast, the present invention utilises a quite different arrangement. As shown in FIG. 8 the sensor 31 incorporates several sensing components into a single sensor housing. More specifically a tube-like housing 52 is provided extending from the control unit 30 between opposite ends of the heating element 28 down into the receptacle 22 and lying between adjacent bends of a portion of the element 28.

Within the housing 52 are disposed a thermal fuse 54 and an electronic temperature sensing element 56. The thermal fuse 54 can be of a variety of types, the basic condition being that an element is provided which becomes non-conducting when a predetermined temperature indicative of an overheat condition is reached. For example, the element may be a fuse of the type sold under the brand name SEFUSE of NEC/SCHOTT, SF Type, containing a pellet which melts at a predetermined temperature breaking an internal electrical contact. The temperature sensing element 56 can likewise take a variety of forms such as a thermistor, the requirement being that a change in temperature produces a change in resistance. An example of a particularly appropriate component is the thermistor of Sentech Model DT104-3977-3P.

The thermal fuse 54 is arranged within an electrically insulating sleeve 55 which is open to allow heat exchange with the rest of the sensor. Lead wires 57 are connected to opposite ends of the thermal fuse, the lead wire extending from the open end of the sleeve 55 having an outer thermally insulating sleeve 58.

The temperature sensing element 56 is arranged near the detecting end of the sensor, being enclosed in an internal cavity within a plug 60 of thermally conductive material which closes the end of the tube 52. It will be seen that the plug 60 is provided with a pair of deep grooves 62 which receive sealing o-rings 64. Towards the outer end, additional grooves 66 are formed which are filled with a synthetic sealing compound at 68. The temperature sensing element 56 is joined to lead wires 70 through a pair of connectors 72 and insulation sleeves 74, all embedded in the cavity within the plug 60 in a volume of sealing compound which fills the plug cavity.

Figure 7:
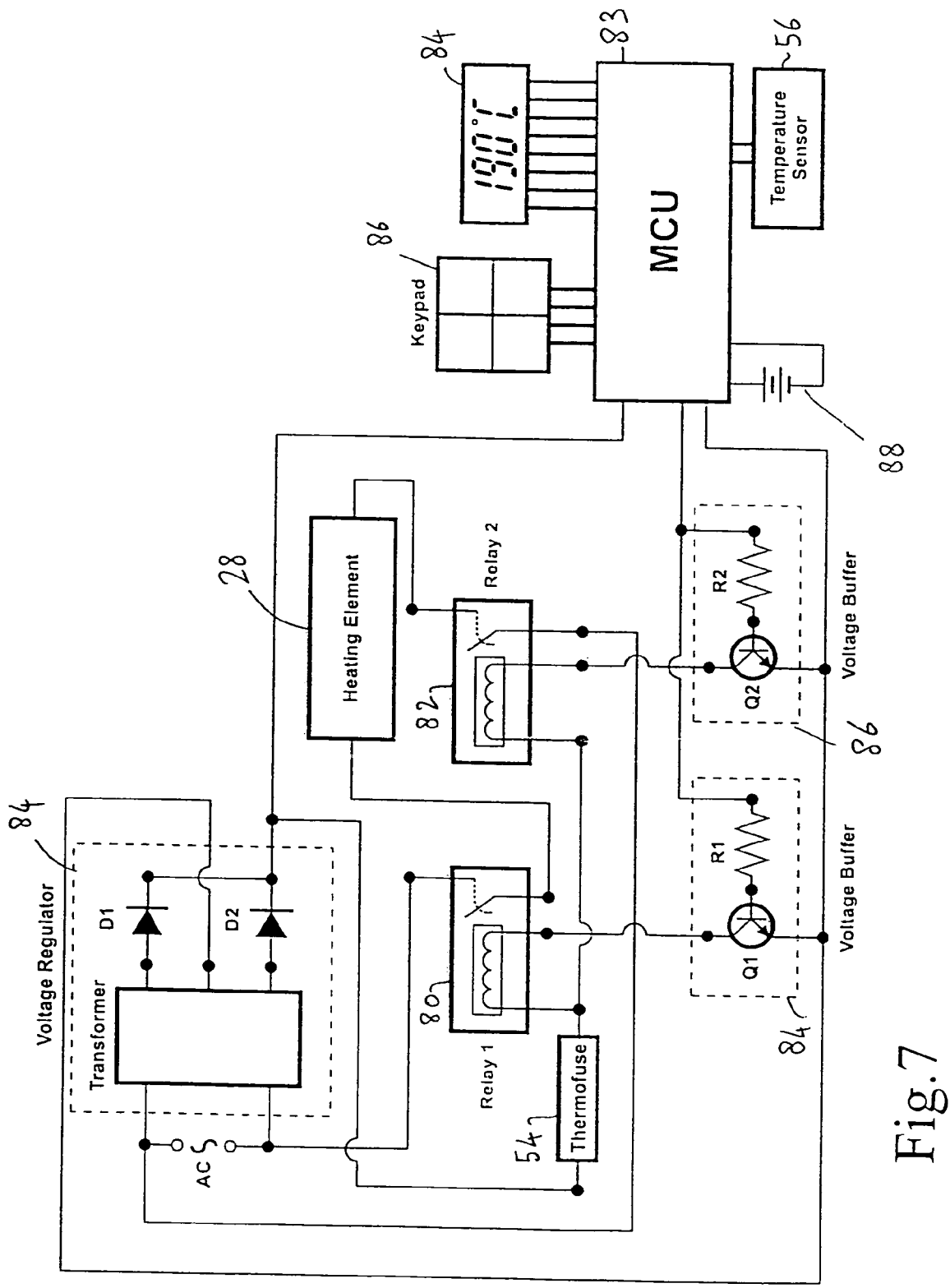
FIG. 7 is a part-schematic circuit diagram of the electrical components of the fryer.

FIG. 7 shows the control circuit, the major part of which is arranged within the control unit 30. The deep fryer is intended to powered by a conventional mains ac supply typically 240V or 110V. The supply is led across the heating element 28 through a pair of solenoid controlled relays 80, 82 which are controlled by the thermal fuse 54. A conventional voltage regulator 84 provides low voltage outputs utilised in the thermal fuse 54 and relay control circuits. If the thermal fuse 54 cuts out in response to an overheat condition the solenoids of both relays 80 and 82 remain open so that no current flows through the heating element. The use of a pair of relays provides redundancy in case of failure of one relay, or total failure of a controlling microcontroller 83. It will be appreciated that whilst the circuit shows solenoid relays, a wide variety of alternative electronic components can be readily substituted, as the skilled person will well understand, for example TRIAC type switches could be employed.

The microcontroller 83 is programmed to effect the various control functions, receiving an input directly from the temperature sensing element 56 and driving an LED or LCD display 84 which shows actual detected temperature as well as displaying other information about the deep fryer, for example time and programming information. A keypad 86 allows the user to input various information such as desired cooking times and temperatures and other operational functions. A low voltage dc battery 88 may be provided as an optional or back-up battery for the microcontroller 83. As will be appreciated, the microcontroller 83 can be programmed to output a signal to open one or both relays on a predetermined temperature being sensed, thereby switching off the heating element. With appropriate programming, the microcontroller can employ techniques such as "fuzzy logic" to anticipate a desired heating control to effect a desired temperature or cooking profile.

Figure 10:
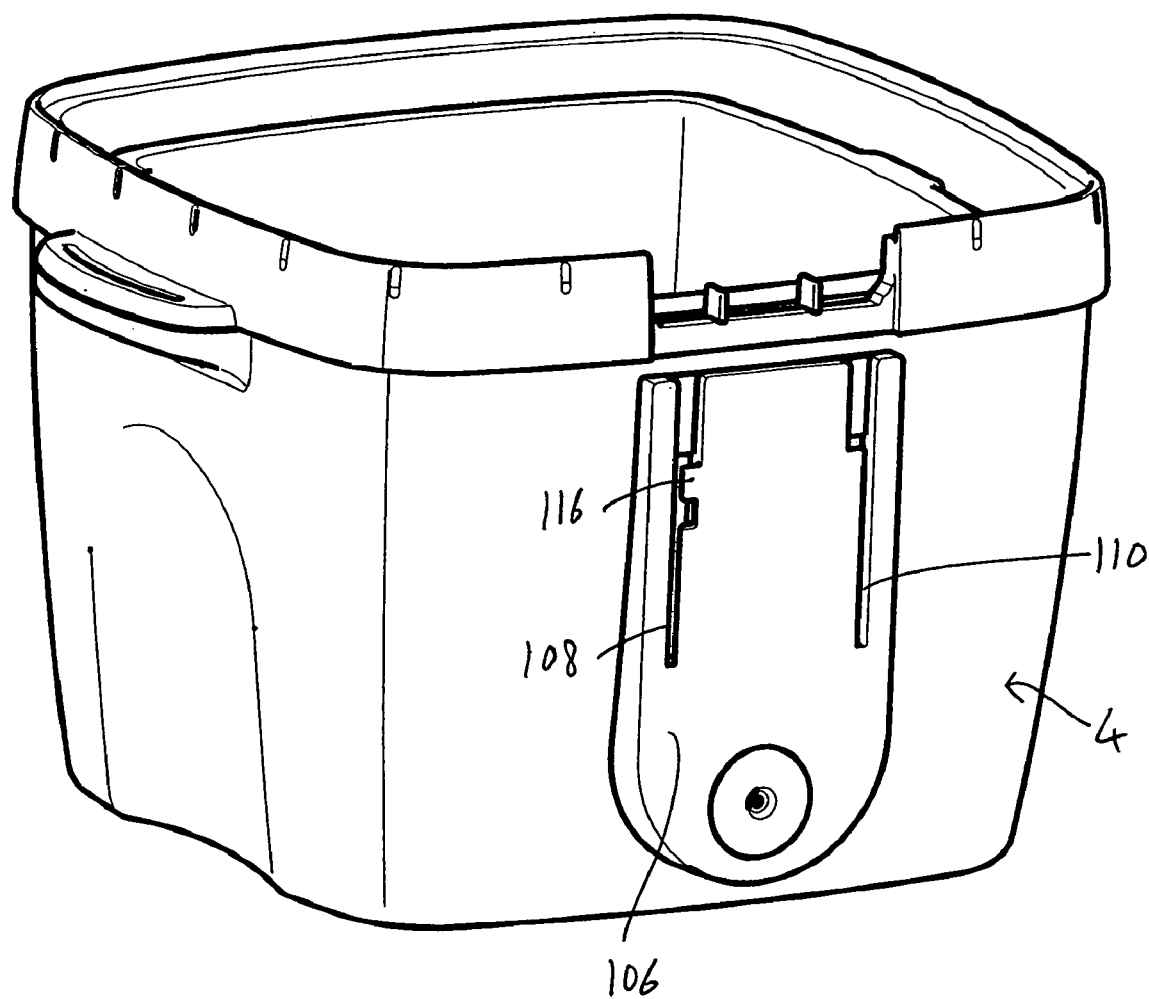
FIG. 10 is a rear view of the housing.
Figure 11:
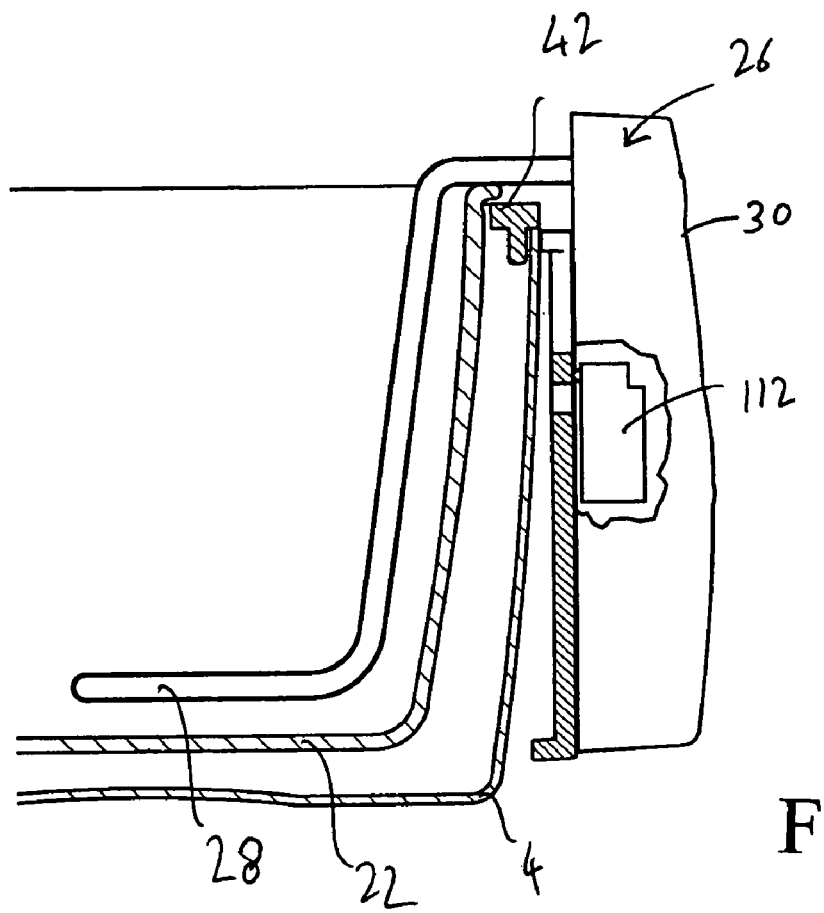
FIG. 11 shows the heating unit correctly fitted into a coating receptacle.
Figure 12:
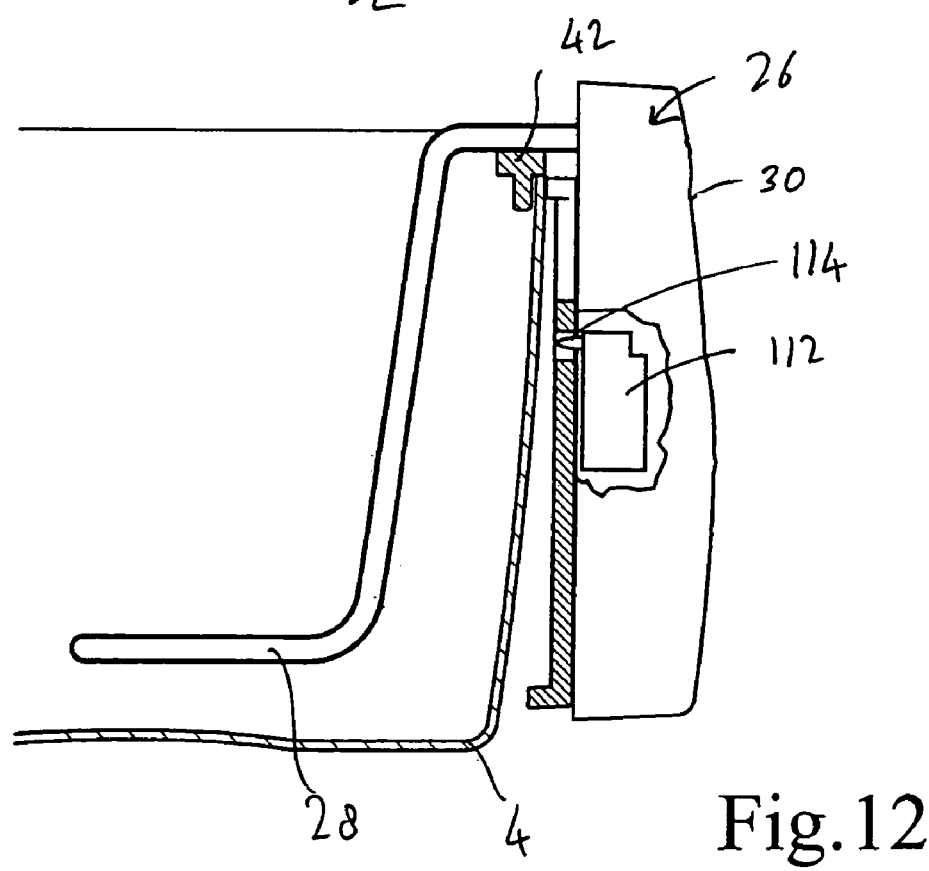
FIG. 12 shows the heating unit erroneously fitted directly into the receptacle, to illustrate a safety cut-out switch.

FIGS. 10, 11 and 12 show an additional safety feature. In the case of a deep fryer having both a housing 4 and receptacle 22 of transparent or translucent material, there is a tiny risk that users might become momentarily confused between the two, and try to cook in the housing 4 installing the heating unit 26 directly into the housing 4. Such a situation is illustrated in FIG. 12. As can be seen in FIG. 10, the rear of the housing 4 is provided with a support plate 106 onto which the heating unit 26 is fitted, with locating ribs on the control unit (not shown) fitting into the vertical slots 108, 110. The control unit 30 is provided with a cut-out switch 112 having a spring actuating pin 114 protruding therefrom towards the plate 106 adjacent the slot 108. Assuming the deep fryer is correctly assembled, with the receptacle 22 fitted, an upper portion of the heating element 28 sits on the upper rim of the receptacle 22. In this position the pin 114 of the cut-out switch 112 faces a lug 116 on the plate 106, which prevents its outward travel. This represents an on position, with the control unit 30 activated. In the event that the receptacle 22 is missing, the heating unit 26 can slide to a lower position, with the upper portion of the heating element instead resting on an upper rim 42 of the housing. In this position the actuating pin 114 springs outwardly into an opening 118 below the lug 116, separating an internal contact pair (not shown) within the control unit and thereby deactivating this, preventing the fryer from being switched on.

What is claimed:

1. A deep fryer comprising an outer housing closed by a lid, and a receptacle for a cooking medium, the housing having an upper rim at which the lid is supported, wherein the underside of the lid has an upwardly domed shape and the rim is formed with a channel arranged beneath the periphery of the underside of lid to receive droplets of moisture condensing on the underside of the lid during use.

2. A deep fryer according to claim 1 wherein the underside of the lid has a smoothly curving profile.

3. A deep fryer comprising an outer housing closed by a lid, the housing having an upper rim at which the lid is supported, wherein the underside of the lid has an upwardly domed shape and the rim is formed with a channel arranged beneath the periphery of the underside of lid to receive droplets of moisture condensing on the underside of the lid during use, and wherein the upper rim of the housing is formed with a lip disposed inwardly of said channel on which, in use, a receptacle for a cooking medium is seated.

4. A deep fryer according to claim 1 wherein the rim is formed at its uppermost and outermost region with a ledge on which the lid sits.

5. A deep fryer according to claim 1 wherein the channel extends around substantially the entire upper rim, and gently slopes around the rim.

6. A deep fryer according to claim 5 where one or more drainage openings are formed in the rim, the rim sloping towards the or each drainage opening.

7. A deep fryer according to claim 6 wherein a moisture collecting receptacle is arranged on the housing beneath the or each drainage opening.

8. A deep fryer according to claim 1 wherein the lid is formed with openings constituting a vent.

* * * * *